United States Patent
Ono

(10) Patent No.: US 6,742,024 B1
(45) Date of Patent: May 25, 2004

(54) HOMEPAGE INFORMATION PRODUCTION SYSTEM

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 09/708,558

(22) Filed: Nov. 9, 2000

(30) Foreign Application Priority Data

Nov. 11, 1999 (JP) ............................................. 11-320474

(51) Int. Cl.$^7$ ................................................. G06F 15/16
(52) U.S. Cl. ...................... 709/219; 709/217; 709/218; 709/206; 445/412.1; 445/419; 445/420
(58) Field of Search ................................ 709/205, 206, 709/217, 218, 219; 455/412.1, 412.2, 418, 419–20

(56) References Cited

U.S. PATENT DOCUMENTS

| | | | | |
|---|---|---|---|---|
| 5,781,901 A | * | 7/1998 | Kuzma | 707/10 |
| 5,937,160 A | * | 8/1999 | Davis et al. | 709/203 |
| 5,945,989 A | * | 8/1999 | Freishtat et al. | 345/760 |
| 6,049,796 A | * | 4/2000 | Siitonen et al. | 707/3 |
| 6,223,213 B1 | * | 4/2001 | Cleron et al. | 709/206 |
| 6,262,735 B1 | * | 7/2001 | Etelapera | 345/854 |
| 6,298,372 B1 | * | 10/2001 | Yoshikawa | 709/200 |
| 6,434,405 B1 | * | 8/2002 | Sashihara | 455/557 |

* cited by examiner

*Primary Examiner*—Glenton B. Burgess
*Assistant Examiner*—Yasin Barqadle
(74) *Attorney, Agent, or Firm*—Foley & Lardner LLP

(57) ABSTRACT

The invention provides a homepage information production system which not only allows transmission/reception of an electronic mail and accessing to a homepage but also allows contents to be produced readily and registered into a homepage server using a portable information terminal such as a portable telephone set. The homepage information production system includes a radio data communication terminal and a homepage control server. The radio data communication terminal produces contents production information to be published in a homepage server, and transmits the contents production information as a mail to a mail server together with a command for execution of the contents production information. The homepage control server produces contents to be written into the homepage server based on the contents production information of the mail received through the mail server in accordance with the command designated in the mail, and registers the produced contents into the homepage server.

18 Claims, 11 Drawing Sheets

FIG. 2

| "TO:" FIELD | HOMEPAGE CONTROL MANAGER |
| --- | --- |
| "SUBJECT:" FIELD | COMMAND, CONTENTS NAME (INCLUDING FOLDER NAME) AND ADDITIONAL INFORMATION |
| TEXT | CONTENTS PRODUCTION INFORMATION (TEXT STYLE) |

OR

| TEXT ACCOMPANYING FILE | CONTENTS PRODUCTION INFORMATION (TEXT AND BINARY STYLES) |
| --- | --- |

FIG. 3

| COMMAND | "SUBJECT:" FIELD | | TEXT | SIGNIFICANCE OF COMMAND |
|---|---|---|---|---|
| | COMMAND OBJECT INFORMATION | ADDITIONAL INFORMATION | | |
| CREATE | CONTENTS NAME | NOT NECESSARY | CONTENTS PRODUCTION INFORMATION FOR NEW REGISTRATION (ENTIRE) | TO NEWLY REGISTER CONTENTS PRODUCTION INFORMATION |
| DELETE | CONTENTS NAME | NOT NECESSARY | NOT NECESSARY | TO DELETE REGISTERED CONTENTS |
| OVER WRITE | CONTENTS NAME | NOT NECESSARY | CONTENTS PRODUCTION INFORMATION FOR CHANGE AND REGISTRATION (ENTIRE) | TO OVERWRITE REGISTERED CONTENTS WITH AND REGISTER CONTENTS PRODUCTION INFORMATION DESCRIBED IN TEXT |
| REPLACE WORD | CONTENTS NAME | KEYWORD | CONTENTS PRODUCTION INFORMATION AFTER CHANGE (PARTIAL) | TO SEARCH FOR KEYWORD INCLUDED IN REGISTERED CONTENTS AND REPLACE KEYWORD WITH CONTENTS PRODUCTION INFORMATION IN TEXT |
| REPLACE SENTENCE | CONTENTS NAME | KEYWORD | CONTENTS PRODUCTION INFORMATION AFTER CHANGE (PARTIAL) | TO SEARCH FOR KEYWORD INCLUDED IN REGISTERED CONTENTS AND REPLACE ENTIRE SENTENCE INCLUDING KEYWORD WITH CONTENTS PRODUCT INFORMATION IN TEXT |
| REPLACE PARAGRAPH | CONTENTS NAME | KEYWORD | CONTENTS PRODUCTION INFORMATION AFTER CHANGE (PARTIAL) | TO SEARCH FOR KEYWORD INCLUDED IN REGISTERED CONTENTS AND REPLACE ENTIRE PARAGRAPH INCLUDING KEYWORD WITH CONTENTS PRODUCTION INFORMATION IN TEXT |
| REPLACE SARCH LINE | CONTENTS NAME | OBJECT START LINE, OBJECT LINE NUMBER | CONTENTS PRODUCTION INFORMATION AFTER CHANGE (PARTIAL) | TO REPLACE OBJECT PORTION INCLUDED IN ADDITIONAL INFORMATION IN REGISTERED CONTENTS WITH CONTENTS PRODUCTION INFORMATION IN TEXT |
| RETRIEVE | CONTENTS NAME | NOT NECESSARY | NOT NECESSARY | TO READ OUT REGISTERED CONTENTS |

PRIOR ART

FTP

HOMEPAGE INFORMATION PRODUCTION SYSTEM

BACKGROUND OF THE INVENTION

1. Field of the Invention

The present invention relates to a homepage information production system wherein a radio data communication terminal machine such as a portable information terminal or a portable telephone set having an electronic mail function or a data transmission function is used as a user terminal which is a service client in an information providing system for providing information such as a homepage of the Internet to effect production of, amendment to or deletion of contents of information.

2. Description of the Related Art

A general construction of a conventional homepage information production system is described with reference to FIG. 9. A computer 6 directly connected to an Internet network 7 is connected to a homepage server 3 or a mail server 4 using the TCP/IP or the like which is an Internet protocol. Where a telephone network 11 is used for connection, a computer 9 is connected to the telephone network 11 through a modem 10 and further connected from the telephone network 11 through a modem 12 and an access server 8 to the Internet network 7 using the TCP/IP/PPP protocol or the like. An electronic mail is communicated between the Internet network 7 and the mail server 4 using the SMTP (Simple Mail Transfer Protocol) or the like. Between the homepage server 3 and the Internet network 7, the HTTP protocol is used for accessing to contents, but the FTP (File Transfer Protocol) is used for data transmission.

For registration of contents, either the contents are transferred as a file using the FTP protocol or contents of the homepage server 3 are edited directly using the Telnet protocol.

A general construction of a homepage information production system for a portable telephone system is described with reference to FIG. 10. A portable telephone packet communication terminal 13 connected to a portable telephone packet network 2 is connected to a homepage server 3 or a mail server 4 using a file transfer protocol for exclusive use for the system or the like. It is to be noted that also the WAP (Wireless Application Protocol) which is a protocol for a portable telephone set and for which standardization is being proceeded at present is one of such file transfer protocols.

FIG. 11 illustrates a concept of a command data format of the FTP protocol. The FTP protocol includes a "Put" command for writing a file and a "Get" command for reading out a file, and transmits, upon writing, a contents name and contents as a command but transmits, upon reading out, a contents name as a command. As a response upon reading out, contents are received.

A prior art registration operation of contents when the FTP is used operates as follows. After contents are produced in a unit of contents, they are written into a homepage server in accordance with a procedure wherein a client terminal directly logs in the homepage server, writes the produced contents into the homepage server and then logs out from the homepage server.

The conventional homepage information production system, however, has the following subjects to be solved. Firstly, since a homepage accessing protocol and a homepage registering protocol are both different from an electronic mail protocol, a portable telephone set or the like does not allow installation of a plurality of protocols from a restriction in terms of the memory capacity. Therefore, the homepage registering protocol is less likely to be installed. Consequently, if a user of a portable telephone set or the like intends to modify a homepage of the user itself using the portable telephone set or the like, it is necessary to use a personal computer or the like to establish a connection to the Internet. Therefore, it is impossible to edit contents of the homepage easily.

Secondly, a great number of users make use principally of electronic mails, and if a different protocol such as the FTP is installed additionally, then user operation is complicated and becomes cumbersome to such users.

SUMMARY OF THE INVENTION

It is an object of the present invention to provide a homepage information production system which has not only a function of allowing transmission/reception of an electronic mail and accessing to a homepage but also another function of allowing contents to be produced readily and registered into a homepage server.

In order to attain the object described above, according to an aspect of the present invention, there is provided a homepage information production system, comprising a radio data communication terminal for producing contents production information to be published in a homepage server and transmitting the contents production information as a mail to a mail server together with a command for execution of the contents production information, and a homepage control server for producing contents to be written into the homepage server based on the contents production information of the mail received through the mail server in accordance with the command designated in the mail and registering the produced contents into the homepage server.

According to another aspect of the present invention, there is provided a homepage information production system, comprising a radio data communication terminal for producing contents production information to be published in a homepage server and transmitting the contents production information as a mail to a mail server together with a command for execution of the contents production information, and a homepage control server for producing, modifying or deleting contents of the homepage server based on the command, a contents name and the contents production information included in the mail from the radio data communication terminal received through the mail server.

In both of homepage information production systems, the mail server may receive the contents production information and perform discrimination a user of whether or not a transmitter of the mail is a registered person of a homepage, and then transfer the received mail to the homepage control server only when the transmitter of the mail is a registered person.

The radio data communication terminal may have application software installed therein for describing a command to the homepage control server in a subject field of the electronic mail to produce contents.

In this instance, the command to the homepage control server may be one or more of a new production command, an overwriting command and a deletion command for the contents production information, and a word replacement command, a sentence replacement command and a paragraph replacement command based on a keyword.

Alternatively, the command to the homepage control server may be a command for replacing a change object line range in the contents registered in the homepage server with the contents production information in the text and registering resulting contents production information.

As the mail information to be transmitted to the homepage control server through the mail server, contents production information based on which contents to be registered into the homepage server is to be produced may be described in the text of the electronic mail.

Alternatively, as the mail information to be transmitted to the homepage control server through the mail server, contents production information based on which contents to be registered into the homepage server is to be produced may be described in an accompanying file to the text of the electronic mail.

The homepage information production systems described above are both advantageous in that, since contents on the homepage server can be controlled with an electronic mail, registration of contents is possible without installation of the FTP protocol. This allows reduction of the capacity of a memory used in a portable information terminal such as a portable telephone set.

The homepage information production systems are advantageous also in that, since an electronic mail function which allows editing even on such a small screen as that of a portable telephone set is used, user operation is unnecessary.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a view showing a mail data format used in the homepage information production system;

FIG. 3 is a table showing details of a "Subject:" field and a detailed construction of the text of the mail data format shown in FIG. 2;

DESCRIPTION OF THE PREFERRED EMBODIMENT

Figure 1:
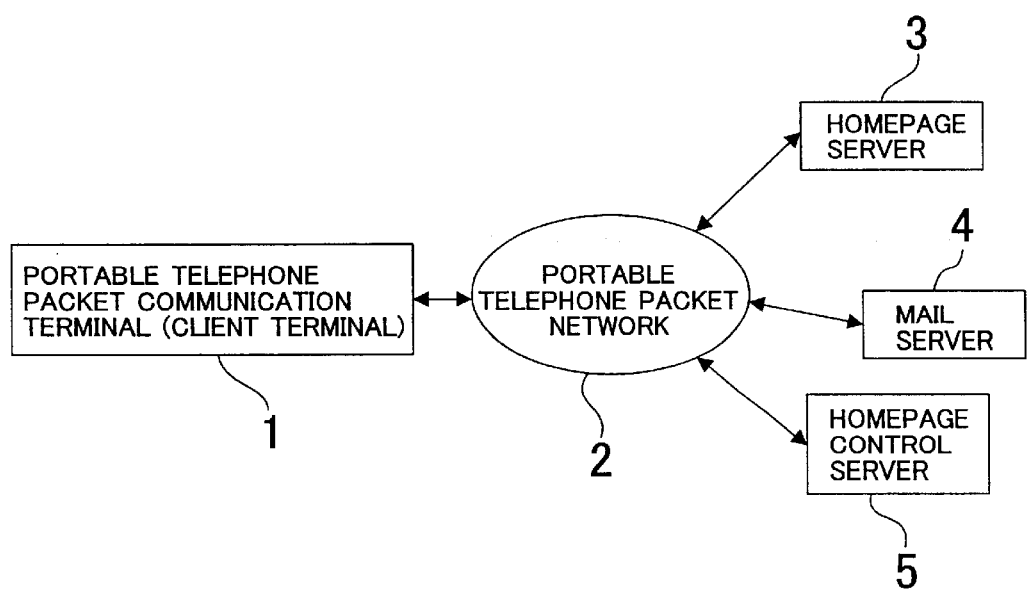
FIG. 1 is a block diagram showing a homepage information production system to which the present invention is applied where a portable information terminal is used.

Referring to FIG. 1 there is shown a simple homepage information production system in which a portable telephone packet communication terminal is utilized as a portable information terminal according to a preferred embodiment of the present invention. A portable telephone packet communication terminal 1 as a client terminal is used to produce contents production information to be published in a homepage server 3 and transmits the contents production information together with a command to be executed as a mail to a homepage control manager registered in a mail server 4. The mail server 4 performs discrimination of a user of the transmission source and, if the transmission source is a legal user, then the mail server 4 transfers the received mail to a homepage control server 5. The homepage control server 5 produces registration contents into the homepage server 3 in accordance with the command indicated in the received mail and the received contents production information, and registers the registration contents into the homepage server 3.

Now, a mail data format used in the embodiment of the present invention is described with reference to FIG. 2. The mail data format substantially coincides with that of the RFC822 and MIME (Multipurpose Internet Mail Extensions) used popularly at present. In the "To:" field indicative of the transmission destination of the mail, the homepage control manager is designated. The homepage control manager is an account registered in the mail server. In the "Subject:" field indicative of the title of the mail, a command indicative of a contents name of contents production information included in the text and a processing method is described. The contents name is a file name to be registered into the homepage server 3 and includes information of a path (folder) under a home directory of the user. In the mail text, contents production information is described. However, if the mail text is of a style other than the text style, then it is stored as an accompanying file making use of the MIME.

FIG. 3 illustrates details of the "Subject:" field and a detailed construction of the text on the mail data format illustrated in FIG. 2.

Referring to FIG. 3, the "Create" command is used to newly register contents production information included in the text into the homepage server. The "Delete" command is used to delete contents stored in the homepage. Therefore, no contents production information need to included in the text. The "Over Write" command is similar to the "Create" command but is used to overwrite existing contents.

The "Replace" command group includes the four commands of "Replace Word", "Replace Sentence", "Replace Paragraph" and "Replace Search Line". The "Replace Word" command describes contents and a contents name and describes a keyword as additional information in the "Subject:" field. The keyword may be a word, a phrase, a sentence or the like included in designated contents on the homepage server and is used to register a keyword in place of the contents information in the text.

The "Replace Sentence" command describes a command and a contents name and describes a keyword as additional information into the "Subject:" field. The keyword may be a word, a phrase, a sentence or the like included in designated contents on the homepage server and is used to register a keyword in place of the contents information in the text.

The "Replace Paragraph" command describes a command and a contents name and describes a keyword as additional information in the "Subject:" field. The keyword may be a word, a phrase, a sentence or the like included in designated contents on the homepage server and is used to register a keyword in place of the contents information in the text.

The "Replace Search Line" command describes a command and a contents name and describes a change object start line and a change object line number in contents registered in the homepage server as additional information in the "Subject:" field. The "Replace Search Line" is used to register the contents production information in the text in place of a change object line range in the contents registered in the homepage server.

The "Retrieve" command is used to read out contents stored in the homepage. The text does not require contents production information or the like.

While various commands are described in detail above, since the RFC822 and the MIME which are a mail data format of FIG. 2 are well known by those skilled in the art and have no direct relation to the present invention, details of them are omitted herein.

It is to be noted that, in the embodiment described above, a password to be used for authentication of a user may be described as additional information in the "Subject:" field, as text data in the text or as an accompanying field.

Figure 4:
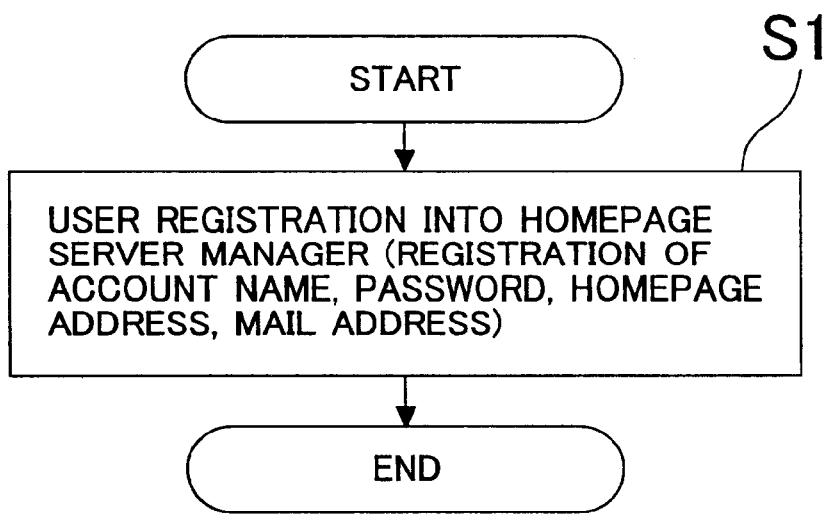
FIG. 4 is a flow chart illustrating a process of preparations for allowing operation of the homepage information production system of FIG. 1.

Now, prior preparations for allowing operation of the homepage information production system of FIG. 1 to be performed is described with reference to FIG. 4. First, a client terminal of a user of a portable telephone set or the like is registered into the system (step S1). The information to be registered may include an electronic mail account name, a homepage address password and so forth. It is to be noted that the present user registration is prior preparations for operation of the system and does not directly relate to an operation flow of the system.

Figure 5:
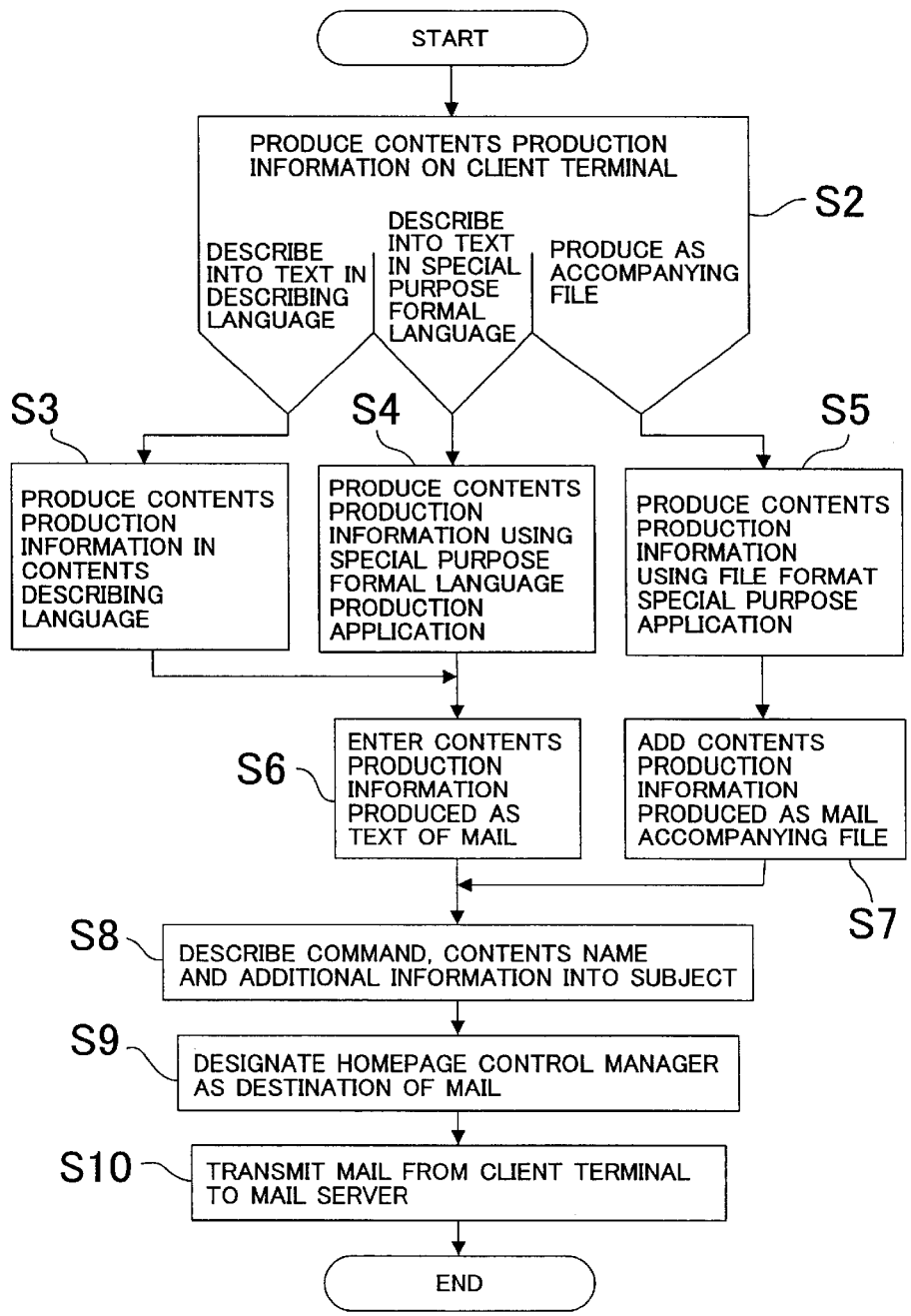
FIG. 5 is a flow chart illustrating an example of operation of a client terminal of the homepage information production system of FIG. 1.

FIG. 5 illustrates a form of an operation flow chart of the client terminal. Referring to FIG. 5, contents production information is produced on the client terminal (step S2). In this instance, if the contents production information is to be produced in a contents describing language in the mail text, then the contents production information is produced in the text style (step S3). On the other hand, if the contents production information is to be described in a special purpose formal language in the mail text, then the contents production information is producing using a special purpose formal language production application (step S4). The special purpose formal language is a language of a format such as the HTML format, the XML format, the WML format prescribed in the WAP Forum or so forth, and the special purpose formal language production application is a tool for production of contents information which relies upon the respective format. Further, contents information including image information and/or sound information produced by a special purpose application is produced as an accompanying file (step S5). The steps described are similar to those conventionally employed for production of contents.

Then, the contents production information produced in such a manner as described above is described as the text or as an accompanying file of a transmission mail (step S6 or S7). Then, a command, a contents name and additional information are described in the "Subject:" field in accordance with the table of FIG. 3 (step S8). Then, the homepage control manager is designated as a destination of the mail (step S9), and the mail is transmitted to the mail server (step S10). The operation of the client terminal for contents registration is completed therewith.

Figure 6:
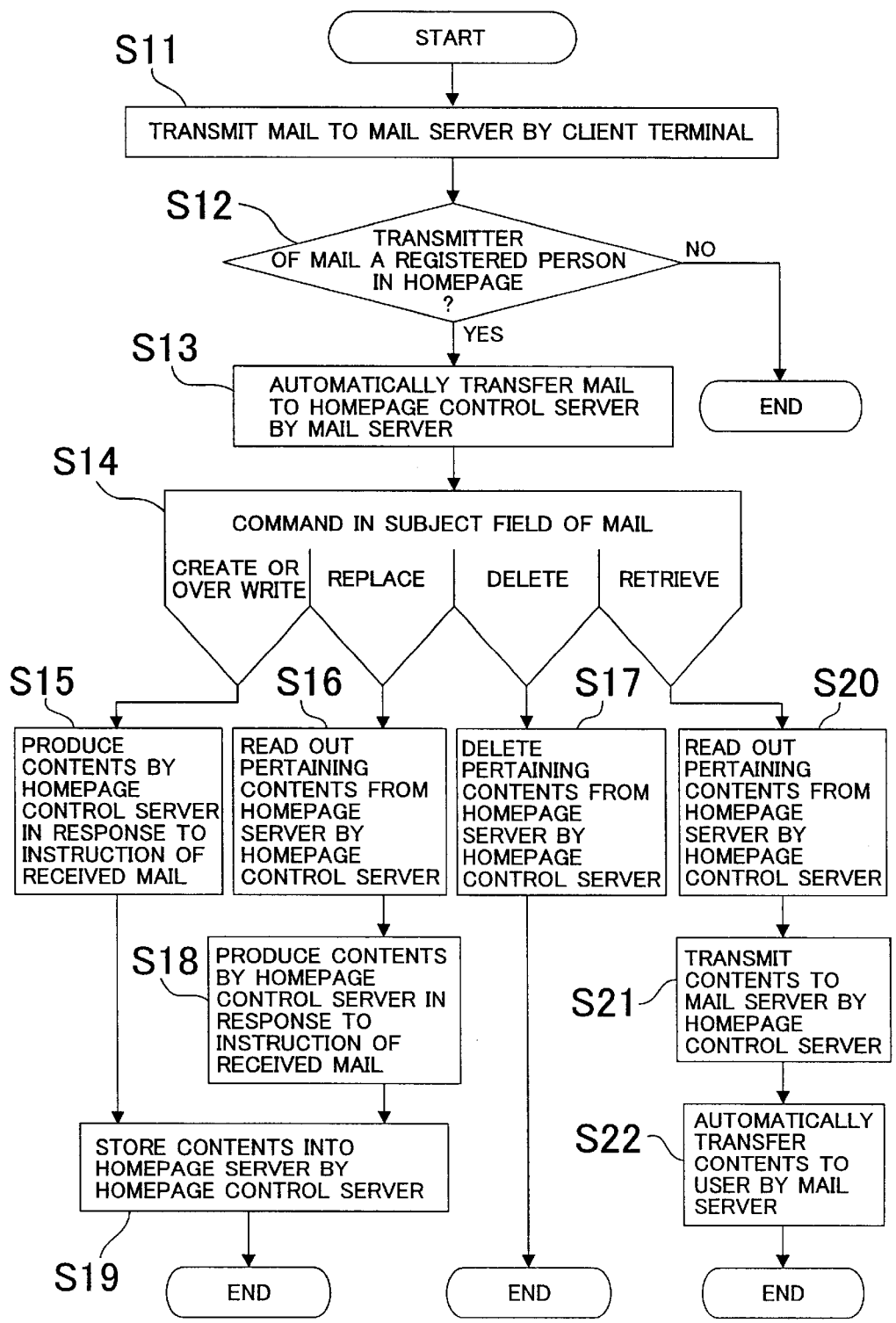
FIG. 6 is a flow chart illustrating an example of operation of a mail server, a homepage control server, and a homepage server of the homepage information production system of FIG. 1.

FIG. 6 illustrates a form of operation of the mail server, homepage control server and homepage server. Referring to FIG. 6, when the mail server receives a mail transmitted (step S11) from a client terminal, it discriminates whether or not the transmitter of the mail is a registered person of a homepage (step S12). If the transmitter of the mail is not a registered person, then the processing is ended immediately. However, if the transmitter of the mail is a registered person, then the mail server transfers the received mail to the homepage control server (step S13).

The homepage control server performs the following processing in accordance with the command described in the "Subject:" field of the received mail (step S14). If the command is the "Create" command or the "Over Write" command, then the homepage control server converts the text or the accompanying file of the received mail into a text or a file of the special purpose format for the homepage server (step S15) and registers the text or the file with the file name designated in the "Subject:" field into the homepage server (step S19).

However, if the command described in the "Subject:" field of the received mail is one of the commands of the "Replace" command group, then the homepage control server reads out contents of a file name designated in the "Subject:" field from the homepage server (step S16), modifies the contents in accordance with the command and converts the modified contents into those of the special purpose format for the homepage server (step S18), and re-registers the contents of the special purpose format with the file name designated in the "Subject:" field into the homepage server (step S19).

On the other hand, if the command described in the "Subject:" field of the received mail is the "Delete" command, then the homepage control server deletes contents of a file name designated in the "Subject:" field from the homepage server (step S17).

However, if the command described in the "Subject:" field of the received mail is the "Retrieve" command, then the homepage control server reads out contents of a file name designated in the "Subject:" field from the homepage server (step S20) and transmits the read out contents to the mail server (step S21). The mail server transmits the received contents as the text or an accompanying file of a mail to the client terminal (step S22).

Figure 7:
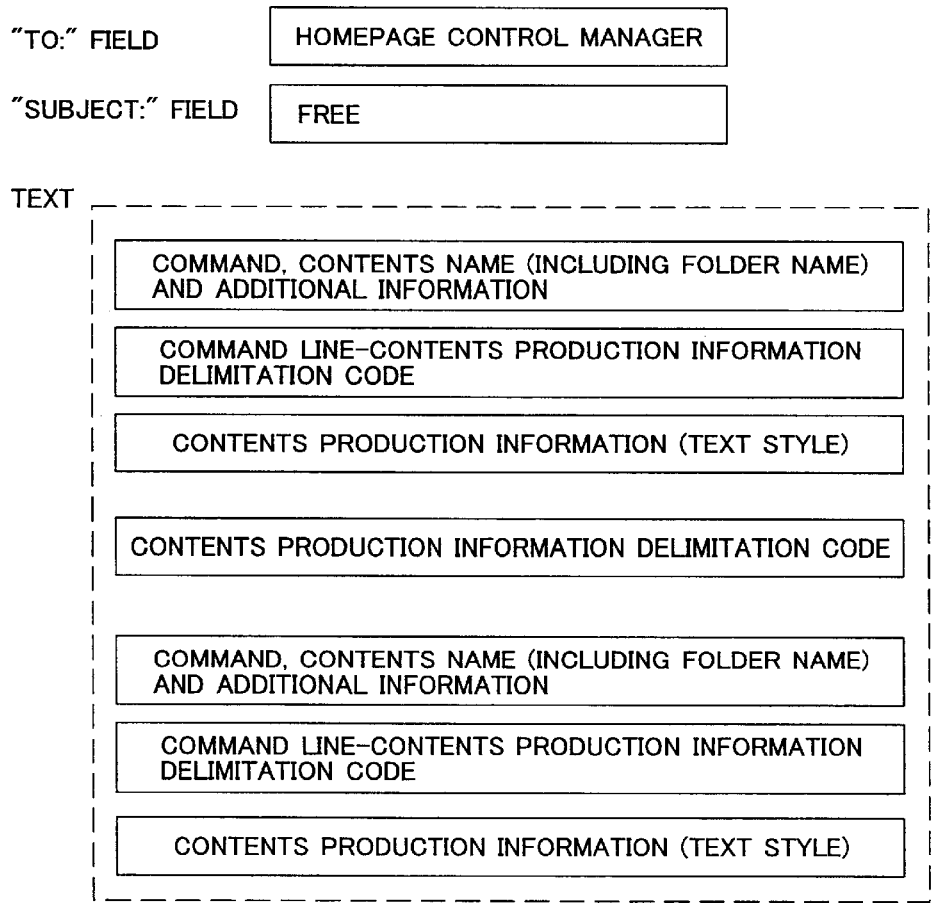
FIG. 7 is a view showing another mail data format which can be used in the homepage information production system of FIG. 1.
Figure 8:
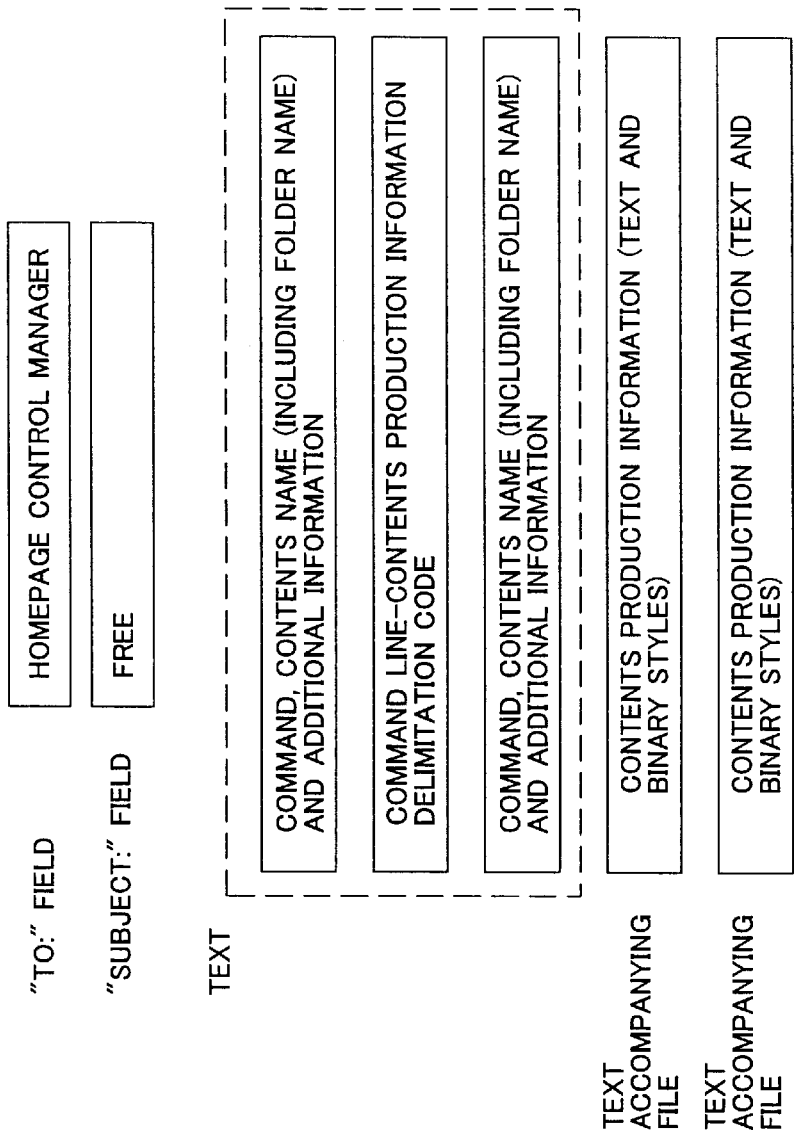
FIG. 8 is a similar view but showing a further mail data format which can be used in the homepage information production system of FIG. 1.
Figure 9:
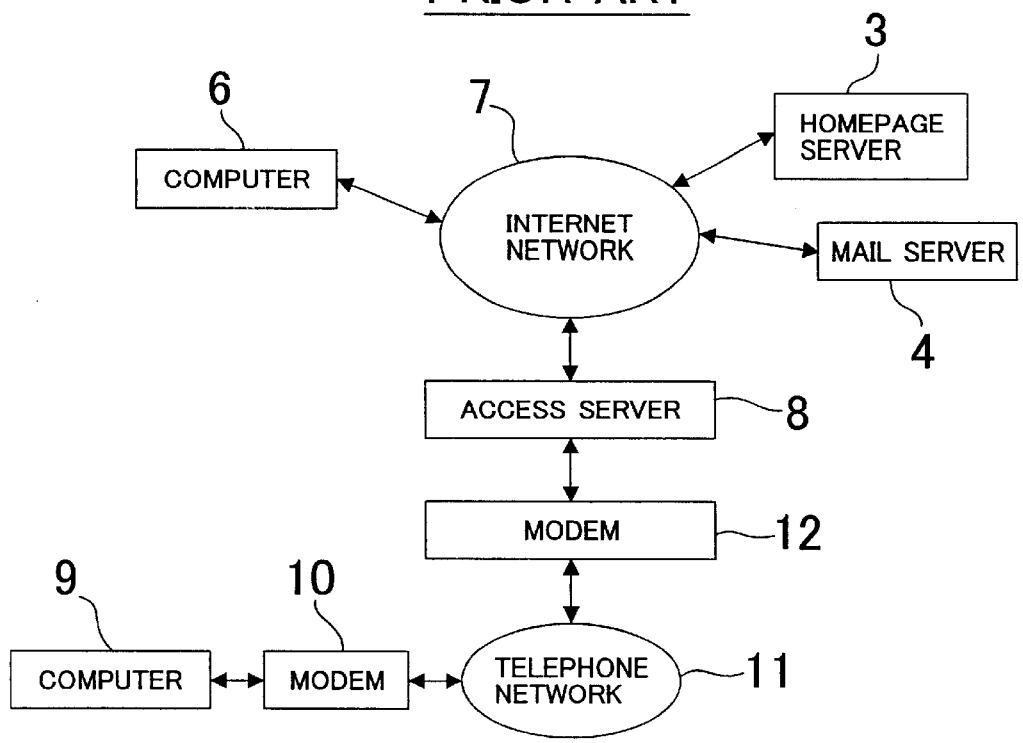
FIG. 9 is a block diagram showing a conventional homepage information production system where a portable information terminal is used.
Figure 10:
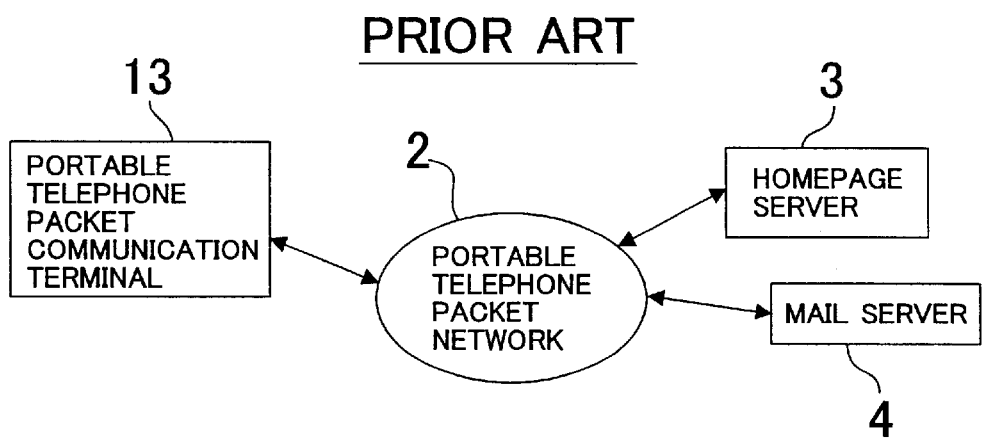
FIG. 10 is a block diagram showing a general construction of a conventional homepage information production system which utilizes a conventional portable telephone system.
Figure 11:
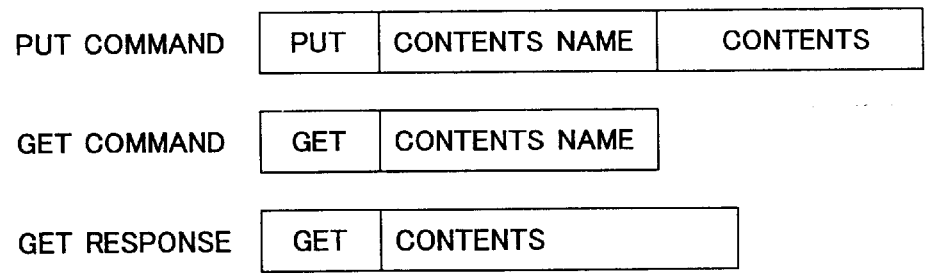
FIG. 11 is a diagram illustrating a concept of a command data format of the FTP protocol.

The homepage information production system may use such a different mail data format as illustrated in FIG. 7 or 8.

Referring first to FIG. 7, there is shown a main data format wherein a command, a contents name and additional information to the homepage control server are described not in the "Subject:" field but in the text of the mail. In this instance, since also contents production information is described in the text, a command line-contents production information delimitation code is inserted as a delimitation between the command lines (command, contents name and additional information) and the contents production information. Further, a contents production information delimitation code can be inserted so that a plurality of command lines and the contents production information may be described as one mail.

Referring now to FIG. 8, there is shown another main data format wherein contents production information is described as a text accompanying file and a plurality of command lines (command, contents name and additional information) are described in the text of the mail. In this instance, a plurality of accompanying files corresponding to a plurality of command lines are placed in the mail.

In this manner, since contents production information is described not in the "Subject:" field but in the text of the mail, a plurality of commands can be described as a single mail. Consequently, an advantage is achieved that a series of operations can be described and this raises the speed of operation of the entire system.

Also a main format which is a combination of the formats of FIGS. 7 and 8 may be used. In other words, part of contents production information may be described in the text of the mail while the remaining part of the contents production information is placed as an accompanying file or files in the mail.

While a preferred embodiment of the present invention has been described using specific terms, such description is for illustrative purposes only, and it is to be understood that changes and variations may be made without departing from the spirit and scope of the following claims.

What is claimed is:

1. A homepage information production system, comprising:
    a radio data communication terminal for producing contents production information to be published in a homepage server and transmitting the contents production information as an electronic mail to a mail server together with a plurality of commands for execution of the contents production information; and
    a homepage control server for producing contents to be written into said homepage server based on the contents production information of the electronic mail received through said mail server in accordance with the plurality of commands designated in the electronic mail and registering the produced contents into said homepage server,
    wherein, as the mail information to be transmitted to said homepage control server through said mail server, contents production information based on which contents to be registered into said homepage server are to be produced is stored in a text field of the electronic mail,
    wherein the text field of the electronic mail has stored therein at least one contents production delimitation code that provides a data boundary in the text field between: i) a first command, a first contents name associated with the first command, and first production information associated with the first command and the first contents name, and ii) a second command, a second contents name associated with the second command, and second production information associated with the second command and the second contents name, and
    wherein information regarding performing either a data store operation or a data retrieval operation, or both, with respect to said homepage server, in accordance with said first command and said second command, are obtained based solely on information within the text field of the electronic mail.

2. A homepage information production system as claimed in claim 1, wherein said mail server receives the contents production information and performs discrimination as to whether or not a transmitter of the electronic mail is a registered person of a homepage, and then transfers the received mail to said homepage control server only when the transmitter of the electronic mail is a registered person.

3. A homepage information production system as claimed in claim 2, wherein said radio data communication terminal has application software installed therein for describing a command to said homepage control server in a subject field of the electronic mail to produce contents.

4. A homepage information production system as claimed in claim 3, wherein the command to said homepage control server is one or more of a new production command, an overwriting command and a deletion command for the contents production information, and a word replacement command, a sentence replacement command and a paragraph replacement command based on a keyword.

5. A homepage information production system as claimed in claim 3, wherein the command to said homepage control server is a command for replacing a change object line range in the contents registered in said homepage server with the contents production information in the text field of the electronic mail and registering resulting contents production information.

6. A homepage information production system comprising:
    a radio data communication terminal for producing contents production information to be published in a homepage server and transmitting the contents production information as an electronic mail to a mail server together with a plurality of commands for execution of the contents production information; and
    a homepage control server for producing contents to be written into said homepage server based on the contents production information of the electronic mail received through said mail server in accordance with the plurality of commands designated in the mail and registering the produced contents into said homepage server,
    wherein, as the mail information to be transmitted to said homepage control server through said mail server, contents production information based on which contents to be registered into said homepage server are to be produced is stored in a first accompanying file and a second accompanying file to a text field of the electronic mail,
    wherein the text field of the electronic mail has stored therein at least one contents production delimitation code that provides a data boundary in the text field between: i) a first command, a first contents name associated with the first command, and ii) a second command, a second contents name associated with the second command, and
    wherein information regarding performing either a data store operation or a data retrieval operation, or both, with respect to said homepage server, in accordance with said first command and said second command, using said contents production information stored in said first and second accompanying files, are obtained based solely on information within the text field and the first and second accompanying files of the electronic mail.

7. A homepage information production system, comprising:
    a radio data communication terminal for producing contents production information to be published in a homepage server and transmitting the contents production information as an electronic mail to a mail server together with a plurality of commands for execution of the contents production information; and
    a homepage control server for producing, modifying or deleting contents of said homepage server based on the plurality of commands, a contents name and the contents production information included in the electronic mail from said radio data communication terminal received through said mail server,
    wherein, as the mail information to be transmitted to said homepage control server through said mail server, contents production information based on which contents to be registered into said homepage server are to be produced is stored in a text field of the electronic mail, wherein the text field of the electronic mail has stored therein at least once contents production delimitation code that provides a data boundary in the text field between: i) a first command, a first contents name associated with the first command, and first production information associated with the first command and the first contents name, and ii) a second command, a second contents name associated with the second command, and second production information associated with the second command and the second contents name, and wherein information regarding performing either a data store operation or a data retrieval operation, or both, with respect to said homepage server, in accordance with said first command and said second command, are obtained based solely on information within the text field of the electronic mail.

8. A homepage information production system as claimed in claim 7, wherein said mail server receives the contents production information and performs discrimination as to whether or not a transmitter of the electronic mail is a registered person of a homepage, and then transfers the received mail to said homepage control server only when the transmitter of the electronic mail is a registered person.

9. A homepage information production system as claimed in claim 8, wherein said radio data communication terminal has application software installed therein for describing a command to said homepage control server in a subject field of the electronic mail to produce contents.

10. A homepage information production system as claimed in claim 9, wherein the command to said homepage control server is one or more of a new production command, an overwriting command and a deletion command for the contents production information, and a word replacement command, a sentence replacement command and a paragraph replacement command based on a keyword.

11. A homepage information production system as claimed in claim 9, wherein the command to said homepage control server is a command for replacing a change object line range in the contents registered in said homepage server with the contents production information in the text field of the electronic mail and registering resulting contents production information.

12. A homepage information production system, comprising:

a radio data communication terminal for producing contents production information to be published in a homepage server and transmitting the contents production information as an electronic mail to a mail server together with a plurality of commands for execution of the contents production information; and a homepage control server for producing, modifying or deleting contents of said homepage server based on the plurality of commands, a contents name and the contents production information included in the electronic mail from said radio data communication terminal received through said mail server, wherein, as the mail information to be transmitted to said homepage control server through said mail server, contents production information based on which contents to be registered into said homepage server are to be produced is stored in a first accompanying file and a second accompanying file to a text field of the electronic mail, wherein the text field of the electronic mail has stored therein at least one contents production delimitation code that provides a data boundary in the text field between: i) a first command, a first contents name associated with the first command, and ii) a second command, a second contents name associated with the second command, and wherein information regarding performing either a data store operation or a data retrieval operation, or both, with respect to said homepage server, in accordance with said first command and said second command, using said contents production information stored in said first and second accompanying files, are obtained based solely on information within the text field and the first and second accompanying files of the electronic mail.

13. A homepage information production system as claimed in claim 1, wherein a subject field of the electronic mail does not contain any command information.

14. A homepage information production system as claimed in claim 6, wherein the first and second accompanying files are attached to said text field in a specific order that corresponds to an order in which said first command and said second command are stored in said text field, and wherein said first and second accompanying files are matched with said first and second commands accordingly.

15. A homepage information production system as claimed in claim 6, wherein a subject field of the electronic mail does not contain any command information.

16. A homepage information production system as claimed in claim 7, wherein a subject field of the electronic mail does not contain any command information.

17. A homepage information production system as claimed in claim 12, wherein the first and second accompanying files are attached to said text field in a specific order that corresponds to an order in which said first command and said second command are stored in said text field, and wherein said first and second accompanying files are matched with said first and second commands accordingly.

18. A homepage information production system as claimed in claim 12, wherein a subject field of the electronic mail does not contain any command information.

* * * * *

UNITED STATES PATENT AND TRADEMARK OFFICE
CERTIFICATE OF CORRECTION

PATENT NO. : 6,742,024 B1
DATED : May 25, 2004
INVENTOR(S) : Hiroshi Ono

It is certified that error appears in the above-identified patent and that said Letters Patent is hereby corrected as shown below:

<u>Title page,</u>
Item [*] Notice, "Subject to any disclaimer, the term of this patent is extended or adjusted under 35 U.S.C. 154(b) by 572 days" should read -- Subject to any disclaimer, the term of this patent is extended or adjusted under 35 U.S.C. 154(b) by 535 days --.

Signed and Sealed this

Twenty-fourth Day of January, 2006

JON W. DUDAS
*Director of the United States Patent and Trademark Office*